United States Patent
Littau

(10) Patent No.: US 9,819,040 B2
(45) Date of Patent: Nov. 14, 2017

(54) PRINTED FUEL CELL WITH INTEGRATED GAS CHANNELS

(71) Applicant: Palo Alto Research Center Incorporated, Palo Alto, CA (US)

(72) Inventor: Karl A. Littau, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 42 days.

(21) Appl. No.: 13/746,564

(22) Filed: Jan. 22, 2013

(65) Prior Publication Data

US 2013/0143143 A1 Jun. 6, 2013

Related U.S. Application Data

(62) Division of application No. 12/325,159, filed on Nov. 29, 2008, now Pat. No. 8,389,165.

(51) Int. Cl.
| | |
|---|---|
| *H01M 8/10* | (2016.01) |
| *H01M 4/88* | (2006.01) |
| *H01M 8/0258* | (2016.01) |
| *H01M 8/1097* | (2016.01) |
| *H01M 8/1007* | (2016.01) |
| *H01M 8/00* | (2016.01) |
| *H01M 8/0297* | (2016.01) |
| *H01M 8/1018* | (2016.01) |
| *H01M 8/0289* | (2016.01) |

(52) U.S. Cl.
CPC ....... *H01M 8/1002* (2013.01); *H01M 4/8814* (2013.01); *H01M 4/8825* (2013.01); *H01M 8/0258* (2013.01); *H01M 8/1007* (2016.02); *H01M 8/1097* (2013.01); *H01M 8/006* (2013.01); *H01M 8/0289* (2013.01); *H01M 8/0297* (2013.01); *H01M 2008/1095* (2013.01); *Y02P 70/56* (2015.11)

(58) Field of Classification Search
CPC .. H01M 8/006; H01M 8/0258; H01M 8/0289; H01M 8/0297
See application file for complete search history.

(56) References Cited

U.S. PATENT DOCUMENTS

| | | | |
|---|---|---|---|
| 6,149,810 A | 11/2000 | Gonzalez-Martin et al. | |
| 7,459,225 B2 | 12/2008 | Apte et al. | |
| 2002/0180094 A1* | 12/2002 | Gough et al. | 264/127 |
| 2003/0194592 A1 | 10/2003 | Hilliard | |
| 2004/0209152 A1 | 10/2004 | Yamada et al. | |
| 2005/0238800 A1* | 10/2005 | Shinn et al. | 427/115 |
| 2007/0181418 A1 | 8/2007 | Hasegawa et al. | |
| 2009/0148740 A1* | 6/2009 | Farag et al. | 429/30 |
| 2010/0136383 A1 | 6/2010 | Littau | |

FOREIGN PATENT DOCUMENTS

WO 2007056518 A2 5/2007

OTHER PUBLICATIONS

Verbraeken, "Advanced supporting anodes for Solid Oxide Fuel Cells", M. Sc. Thesis, Faculty of Science and Technology, Inorganic Materials Science , Mar. 2005.*

* cited by examiner

*Primary Examiner* — Ladan Mohaddes
(74) *Attorney, Agent, or Firm* — Fay Sharpe LLP

(57) ABSTRACT

A printed fuel cell having integrated gas channels, and having an anode layer, where a first gas diffusion electrode layer is periodically fixed to the anode layer, wherein the periodically fixed first gas diffusion electrode layer defines hydrogen flow field channels. A first catalyst material is coated or infused to the first gas diffusion electrode layer. An electrolyte membrane covers portions of the anode layer and first gas diffusion electrode layer with the first catalyst material. A second catalyst material is coated or infused to the electrolyte membrane. A second gas diffusion electrode layer is in operative association with the electrolyte membrane and second catalyst material, on a surface of the electrolyte membrane different from a surface of the electrolyte membrane which is in contact with the first gas diffusion electrode layer, and a perforated cathode is in contact with the second gas diffusion electrode layer.

13 Claims, 5 Drawing Sheets

PRINTED FUEL CELL WITH INTEGRATED GAS CHANNELS

This application claims the priority, as a divisional, of U.S. application Ser. No. 12/325,159, filed Nov. 29, 2008 (published Application No. US2010-0136383-A1), the disclosure of which is incorporated herein by reference in its entirety.

BACKGROUND

The present application is directed to fuel cells and more particularly to fuel cell structures and methods of manufacturing the same. Presently, components used in the manufacturing of fuel cells, such as flow fields, gas diffusion electrodes (GDEs), and electrolytic membranes (EM) are built separately as discreet elements and laminated together during an assembly process. This existing manufacturing process limits the structures of the elements to that which can be made individually at a reasonable cost, which in turn limits performance of resultant fuel cells.

A particular description of a fuel cell is U.S. Pat. No. 6,149,810 to Gonzalez-Martin et al., issued Nov. 21, 2000, which is directed to fuel cells having membrane with internal passages formed in bulk, being used to supply cooling water to the system. Particularly, the patent states that it describes a proton exchange membrane for use in electrochemical cells having internal passages parallel to the membrane surface, comprising permanent tubes preferably placed at the end of the fluid passages. The passages in the membrane extend from one edge of the membrane to another and allow fluid to flow through the membrane and give access directly to the membrane.

Another fuel cell design is described in U.S. Patent Application Publication No. US 2005/0112433 A1, to Apte et al., published May 26, 2005, which addresses the problem of mechanical failure in thin electrolytes. One embodiment is directed to varying the thickness of the electrolyte and positions at least either the anode or cathode in a recessed region to provide a short travel distance from ions traveling from the anode to the cathode or from the cathode to the anode. The second embodiment employs a uniquely-shaped manifold cover to allow close positioning of the anode to the cathode.

To improve the usefulness of fuel cells, it is considered desirable to be able to manufacture a fuel cell as a monolithic device with microstructures and thin and thick films optimized for high performance.

BRIEF DESCRIPTION

A method of manufacturing a fuel cell includes applying a sacrificial material periodically to a surface of an anode substrate, wherein at least some areas of the anode substrate have no sacrificial material. A first gas diffusion layer is applied to the sacrificial material, and a first catalyst material is applied to the first gas diffusion layer. An electrolyte material is applied to the anode substrate and the first gas diffusion layer, with the catalyst material, wherein a first surface of the electrolyte material is in operative association with the anode substrate, and the first gas diffusion layer. A second catalyst material is applied to the second surface of the electrolyte material. A second gas diffusion layer is applied to the electrolyte material on a second surface of the electrolyte material, with the catalyst material, wherein a first surface of the second gas diffusion layer is in contact with the second surface of the electrolyte material with the catalyst material. A cathode is applied to the second gas diffusion layer with the second catalyst material, and the sacrificial material is then removed from the surface of the anode substrate to create integrated gas channels for the manufactured fuel cell.

DETAILED DESCRIPTION

Figure 1:
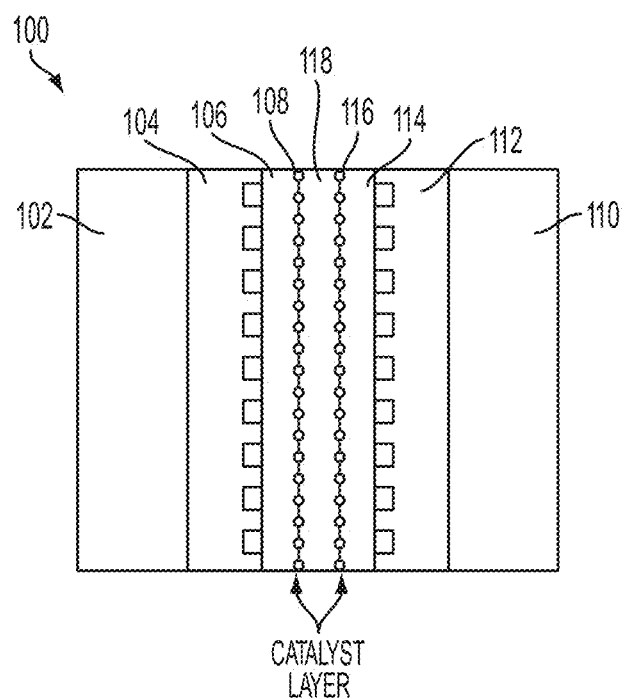
FIG. 1 is a cross section of an existing hydrogen fuel cell configuration.

FIG. 1 discloses a cross section of a typically constructed hydrogen fuel cell 100. On one side an anode 102 is operatively associated with a hydrogen flow field 104, which in turn is operatively associated with a first gas diffusion electrode (or layer 106, coated/infused with a first catalyst material in the form of a first catalyst layer 108. On another side a cathode 110 is operatively associated with an air/oxygen flow field 112, which in turn is operatively associated with a second gas diffusion electrode (or layer) 114 coated/infused with a second catalyst material in the form of a second catalyst layer 116. Fuel cell 100 is further comprised with an electrolyte membrane (or material 118 located between the first gas diffusion electrode 106 having the first catalyst layer 108 and the second gas diffusion electrode 114 having the second catalyst layer 116. The construction and composition of the first and second gas diffusion electrodes 106 and 114 may be the same or different from each other. Similarly, the construction and composition of the first and second catalyst layers 108 and 116 may be the same or different from each other.

In fuel cell 100, reactive gasses flow through the hydrogen flow field channel 104 and the air/oxygen flow field channel 112, against respective gas diffusion electrodes (GDE) 106 and 114. The GDE's 106 and 114 are porous, conductive layers typically impregnated with hydrophobic material (not shown) and coated/infused with catalyst materials 108 and 116 to activate a dissociation of reactants of the reactive gases flowing through the hydrogen flow field channels 104.

GDE's 106 and 114 are in a fixed contact with electrolyte membrane 118 in an arrangement that allows the movement of ionic species (not shown) between GDE's 106 and 114. Electrolyte membrane 118 may be a polymer electrolyte membrane such as but not limited to a cation exchange polymer, such as Nafion (a registered trademark of E. I. DuPont De Nemours and Company), which is commonly used in hydrogen fuel cells. The reactive gasses may in one embodiment include a hydrogen fuel which is channeled through the hydrogen flow field channel 104 and an oxidant (i.e., oxygen and/or air) which is channeled through the air/oxygen flow field 112.

Of course, fuel cells other than hydrogen fuel cells are known, and the foregoing is provided simply as an example. It is to be understood the concepts of the present application may be applied to a variety of fuel cells using a variety of fuels and designs. The elements described herein as flow fields (e.g., flow fields 104, 112) are at times also identified as gas channels and flow channels.

It is known the nature of the components making up fuel cell 100 and other existing fuel cell designs impact the cost and performance of the fuel cell. For example, the thickness of an electrolyte membrane has an important effect on the efficiency. Commonly the electrolyte membrane is made as thin as possible to increase ionic conductivity of the fuel cell. However, there is a minimum thickness beyond which the electrolyte membrane no longer maintains mechanical integrity and becomes susceptible to cracks. Such cracks allow diffusion of un-reacted fuel across the membrane, diminishing the effectiveness of the fuel cell. The thickness of a GDE and the size of flow field channels are also important in determining efficiency of a fuel cell. Thin GDE's can enhance gas diffusion, but reduce lateral conductivity. Thinner gas channels can reduce the lateral path for current to flow in the GDE, but restrict the flow of reactants and can be difficult to manufacture. Finally, making the components as compliant and flexible as possible is advantageous in avoiding failure of the fuel cell due to mechanical stresses encountered during operation such as due to swelling and contraction.

Figure 2:
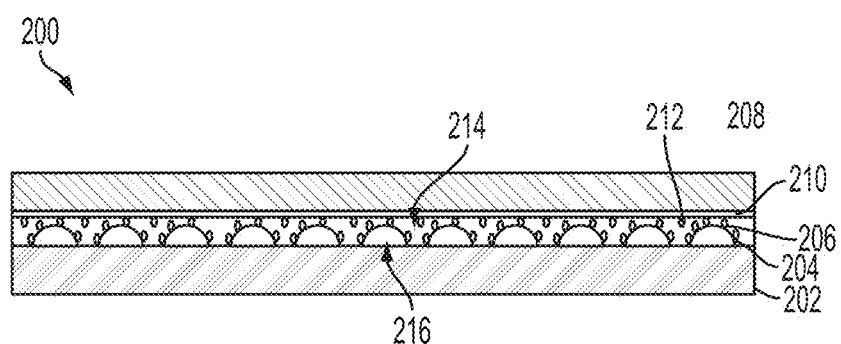
FIG. 2 depicts a fuel cell according to the concepts of the present application with embedded flow field on a fixed support.

Turning now to FIG. 2, illustrated is an improved fuel cell 200 configured with an anode 202 and operatively associated first gas diffusion electrode 204 infused with or coated by a first catalyst layer 206. A cathode 208 is operatively associated with a second gas diffusion electrode 210, which is infused with or coated by second catalyst layer 212. Located between the first gas diffusion electrode and second gas diffusion electrode is an electrolyte membrane 214. The structure of the first gas diffusion electrode 204 provides for imbedded hydrogen flow field channels 216. Particularly, fuel cell 200 is manufactured using methods which enable unique structures including very thin membranes with fine flow field channels and thin gas diffusion electrodes (also called herein gas diffusion layers). The methods employed also permit the fuel cell to be manufactured inexpensively, compared to existing manufacturing processes, while maximizing compliance, strength, and flexibility. As will be expanded on below, fuel cell 200 is a monolithic device with micro-structures and thin and thick film optimized for high performance.

With continuing attention to FIG. 2, hydrogen flow field 216 is defined by the texture or structure of first gas diffusion electrode 204 to which a surface of electrolyte membrane 214 conforms. Electrolyte membrane 214 is formed as a matrix which is periodically fixed positively to anode 202 either directly or through the first GDL layer adhered directly to the anode giving it good support and resistance to breakage. By this arrangement, a first surface of the electrolyte membrane 214 is in operative association with the anode substrate. Anode 202 can be, among other elements, an inexpensive metal foil which is both flexible and durable.

Cathode 208 is an expanded metal cathode which gives good lateral conductivity while enabling the diffusion of oxygen to the cathode side or second gas diffusion electrode. The expanded metal cathode 208 is in one embodiment perforated with through holes arrayed throughout its structure (e.g., the perforation may be on a macro scale, i.e., with mm to cm). In this way the structural support for the fuel cell is provided by the anode 202, while the electrolyte membrane 214 can be as thin as possible while maintaining its integrity. This would not be possible for membranes which also had to maintain mechanical integrity discretely in sheet form such as during assembly. In addition the flow field channels 216 are placed very close together allowing maximum area of gas diffusion presented to the electrolyte membrane 214. In this embodiment a surface of the electrolyte membrane 214 which is in contact or association with the second gas diffusion electrode 210 has a planar surface.

Figure 3:
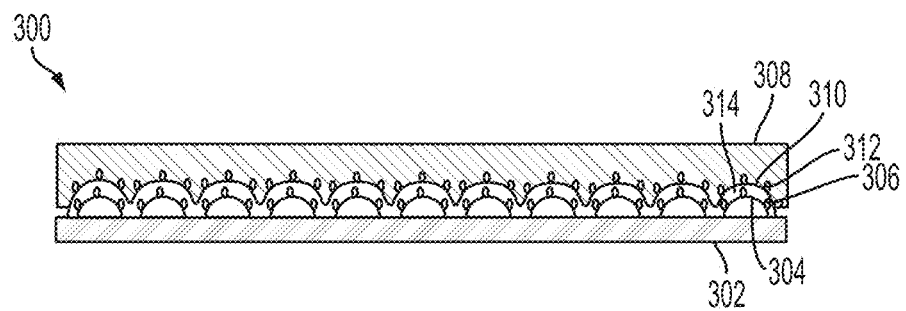
FIG. 3 illustrates an alternative fuel cell embodiment with a conformal, non-planar electrolyte.

Turning now to FIG. 3, illustrated is an alternate fuel cell 300 embodiment having a non-planar electrolyte membrane. In this fuel cell 300, an anode 302 and a first gas diffusion electrode 304 (with a first catalyst layer 306) are configured similar to the fuel cell of FIG. 2. However, a cathode 308, second gas diffusion electrode 310 (with a second catalyst layer 312) and electrolyte membrane 314 are configured distinct from the fuel cell of FIG. 2.

More particularly, electrolyte membrane 314 is of a non-planar uniform thickness for increased ionic conductance. Second gas diffusion electrode 310 is similarly also non-planar and conforms to the configuration of electrolyte membrane 314. Cathode 308 is configured such that a lower surface in contact operatively or associated with a surface of the second gas diffusion electrode 312, is non-planar, while another surface of cathode 308 is planar.

The method to manufacture fuel cells 200 and 300 may be accomplished by printing, spray coating, dip coating, spin coating, laminating and/or a combination of these processing operations to construct a monolithic structure.

Figure 4A:
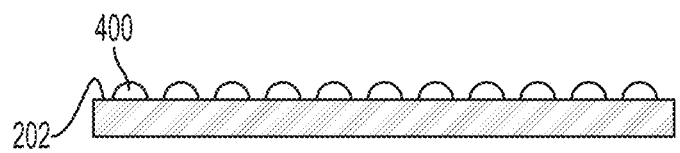
FIGS. 4A-4G depict a method of manufacturing a fuel cell according to the concepts of the present application having embedded flow field channels.

Turning to FIGS. 4A-4G, depicted are processing steps to manufacture fuel cell 200 (these steps can of course be modified to construct other fuel cells, such as but not limited to fuel cell 300). In FIG. 4A, a conductive foil or sheet, such as but not limited to metal, is used as anode substrate 202. Initially, a sacrificial material 400 is applied (e.g., by printing using jet, extrusion, acoustic or other appropriate printing process which provides fine control) to a surface in a linear or other connected (i.e., repeating) pattern. Possible sacrificial materials include but are not limited to a wax or resist which would be melted or dissolved out later. Other sacrificial materials could be lower molecular weight organic materials which would be solid at room temperature but are sublimed or melted and evaporated. An example of such a material is L-Menthol.

Figure 4B:
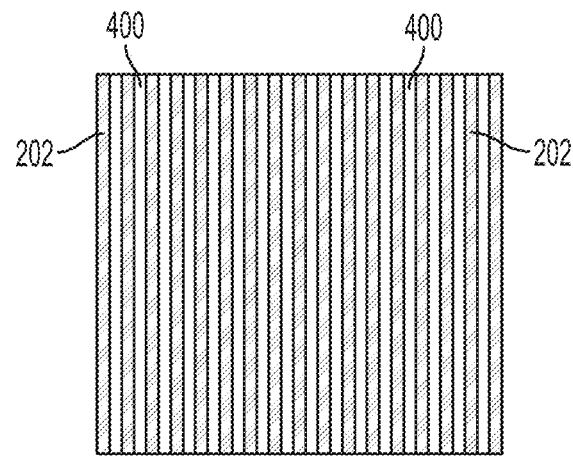

As illustrated in the top view of FIG. 4B, in this embodiment, sacrificial material 400 is printed in a repeating form, with alternating areas of the anode 200 having no sacrificial material 400 printed thereon.

Figure 4C:
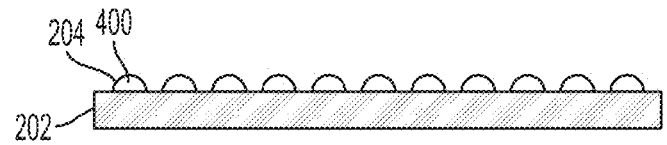

Turning to FIG. 4C, following application of sacrificial material 400, first gas diffusion electrode/layer 204 may be applied through lamination or printing a porous conductor such as carbon fiber. As depicted, material of first gas diffusion layer 204 conforms to the pattern or texture of the printed sacrificial material 400. As previously mentioned, the first gas diffusion layer 204 may be patterned/applied in one embodiment only over the sacrificial material 400 (such that it will only be over the flow fields). However, in an alternative embodiment, the first gas diffusion layer 204 may be applied over the sacrificial material 400 and any area of anode 202 not covered by the sacrificial material 400. FIG. 4C is intended to represent both such possibilities. Thus, the electrolyte membrane 214, in one embodiment, may be in direct contact with the anode substrate while in other embodiments the electrolyte membrane 214 is in contact with the anode through the first gas diffusion layer 204.

Carbon fiber slurries could be one material to use for this application. Other conductive pastes which yield a porous structure could also be used. An alternate material could be carbon black optionally mixed with material to make it more porous such as particles of ammonium carbonate (which completely evaporates when heated forming a porous carbon black film). These slurries may also include hydrophobic materials to help exclude water in operation (alternatively hydrophobic materials could be applied later).

Figure 4D:
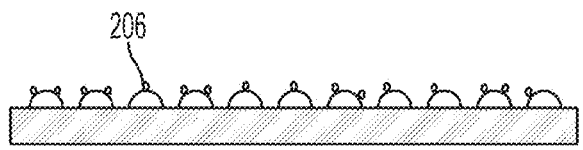

Turning to FIG. 4D, catalyst layer 206 is formed by application of material such as a solvent suspension of Pt catalyst formed with PT (Platinum) particles or with another catalyst, in some embodiments in a solution along with a hydrophobic material and/or an electrolyte material. Catalyst layer 206 may be formed from nanoparticles and is, in some embodiments, applied to first gas diffusion electrode 204 by coating or infusing the first gas diffusion electrode 204.

Figure 4E:
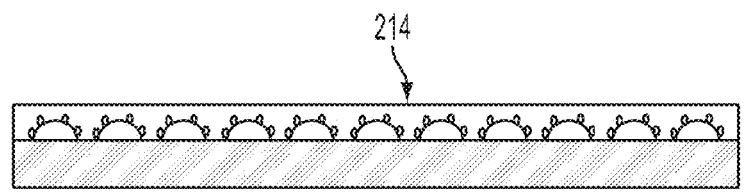
Figure 4F:
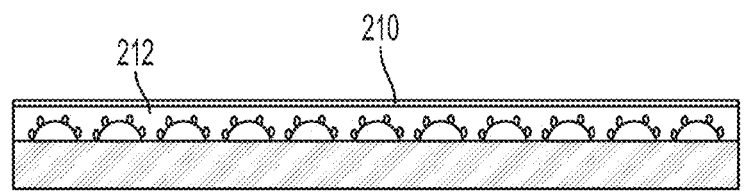

Next, as shown by FIG. 4E, the electrolyte membrane 214 is applied to a surface of gas diffusion electrode 204 and to a surface of anode 202. Many different electrolytes can be applied. One example would be polymer electrolytes such as non-crosslinked or heterogeneous Ion Exchange Resins may be dissolved and painted, sprayed, or printed. They can also be melted and cast. Other polymer electrolytes can be cast or printed and polymerized and/or crosslinked in place. A common crosslinked matrix is divinylbenzene styrene copolymer. Alternatively, a thin support matrix such as an inert fiber (glass or cellulose) is applied by various ones of the above-mentioned procedures and filled with a liquid or gelled electrolyte. If the electrolyte is cast or painted, it can be planarized as is shown in FIG. 4E or possibly, if it is sprayed or laminated, it could conform to the sacrificial material (i.e., such as in fuel cell 300 shown in FIG. 3). After application of electrolyte membrane 214 and following curing and other appropriate post deposition process (if necessary), second gas diffusion electrode 210 and second catalyst layer 212 are applied as shown in FIG. 4F. Specifically, the second catalyst material 212 is applied onto electrolyte membrane 214, and then the second gas diffusion electrode 210 is applied. Alternatively, if laminated, second gas diffusion electrode 210 and second catalyst layer 212 may be prepared together in a separate operation and then applied.

Figure 4G:
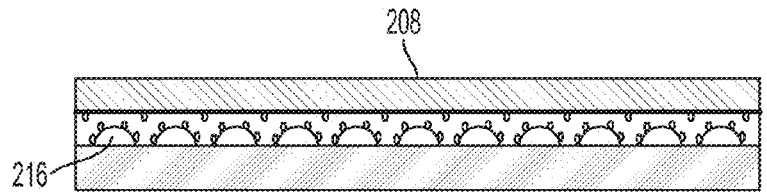

Finally, as shown in FIG. 4G, expanded metal (or other porous) cathode 208 is applied and the sacrificial material 400 is removed through melting, dissolution, etching, or other appropriate method to form fuel cell 200 with integrated flow field channels 216.

Figure 5A:
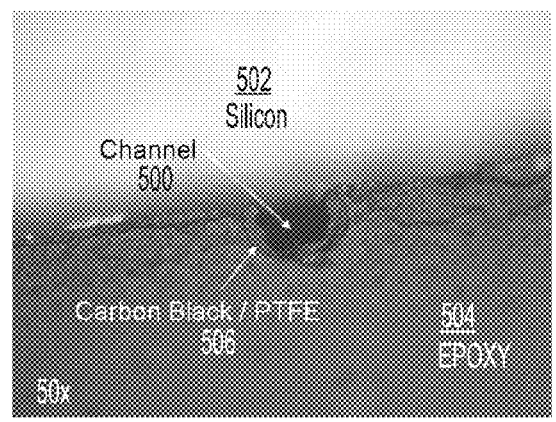
FIG. 5A illustrates an isolated single flow channel configured in accordance with the concepts of the present application.
Figure 5B:
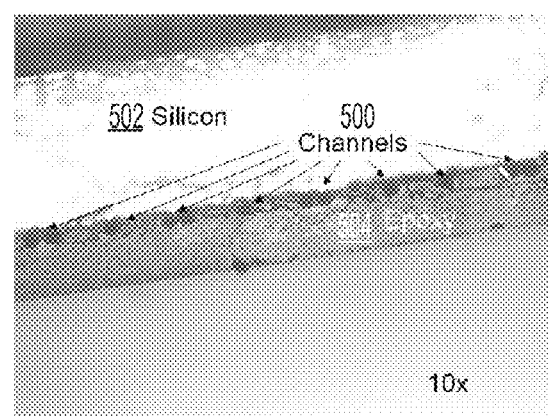
FIG. 5B illustrates a plurality of flow channels.

Turning now to FIGS. 5A-5B, shown is a structure based on the preceding description. In this structure, wax lines were printed on a silicon wafer substrate approximately 20-30 microns in width. On top of these lines was coated a layer of carbon black mixed with PTFE (Polytetrafluoroethylene) in MEK (Methyl Ethyl Ketone) solvent. After the solvent dried, a layer of low cure temperature epoxy to simulate a crosslinkable polymer was coated over the substrate. After curing, the sample was placed in a hot soapy water solution and heated to boiling. After removal, the sample was rinsed and heated to 120° C. on a hotplate to drive off water.

FIG. 5A depicts a single isolated channel. The silicon substrate 502 is in the upper portion of the image and the polymer epoxy 504 is in the lower portion of the image. The empty channel is clearly seen with an approximately 5-10 um thick carbon black/PTFE layer 506 surrounding the inside of the channel. FIG. 5B shows many of channels 500 at lower magnification.

Figure 6:
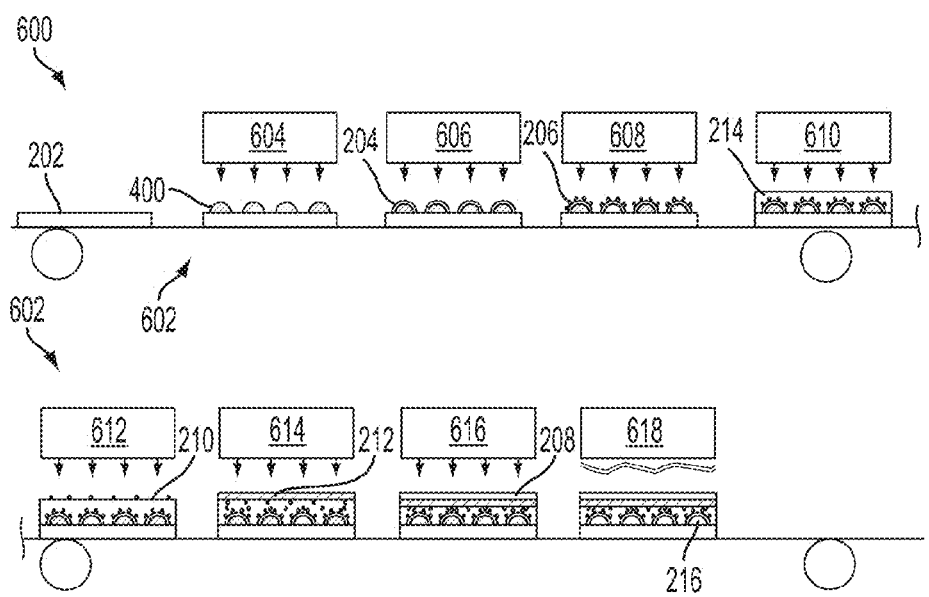
FIG. 6 depicts a roll-to-roll processing for manufacturing the fuel channels of the present application.

Turning now to FIG. 6, illustrated is the manufacture of a fuel cell in accordance with the concepts of the present application, in a roll-to-roll processing environment 600. Initially, a substrate used as anode 202 is located on a conveying system 602. Anode 202 is provided at a presized length. Alternatively, anode 202 may be provided as a continuous strip which is later separated into small units. The anode 202 may be in the form of a thin flexible conductive material such as metal or other appropriate material. As anode 202 moves along conveying system 602, it passes under a first application mechanism 604, such as a jet printer, extrusion printer, acoustic printer, piezoelectric printer or other known printing device, which is able to print a fine pattern of sacrificial material 400 on a surface of anode 202. Then, the process moves to a next application device 606, which may be any printer capable of printing a porous conductor such as a carbon fiber as first gas diffusion layer 204. The printed first gas diffusion layer 204 conforming to the geometric shape of sacrificial material 400. The conveying system 602 then moves the unfinished fuel cell under an application device 608, which applies a catalyst material onto a surface of the first gas diffusion layer. In one embodiment, the application device 608 is a sprayer designed to spray a catalyst, such as a solvent suspension of Pt particles or other appropriate catalyst, possibly with a hydrophobic material and/or an electrolyte material. The spraying provides a coating onto first gas diffusion layer 204, or may infuse the catalyst layer into the first gas diffusion layer 204. Thereafter, the process moves under an electrolyte material application device 610, which may be a printer designed to print a polymer electrolyte material to form electrolyte membrane 214. Alternatively, application device 610 may be a system configured to allow for the melting, casting or painting of electrolyte membrane 214. If cast or painted, electrolyte membrane may be planar of the side opposite first gas diffusion layer 204, as shown in the Figure. Alternatively, and as previously mentioned, it may be possible to spray, laminate, print or otherwise apply the electrolyte membrane, such that it conforms to the geometric shape of the sacrificial material, and thereby conform to first gas diffusion layer 204. In either case, once the electrolyte membrane 214 has been formed, the process moves under application mechanism 612, which sprays or otherwise applies second catalyst material 212. Once this layer is applied, the process moves to application device 614, which in one embodiment, is a printer which prints second gas diffusion electrode 210. Once the second catalyst layer and second gas diffusion layer have been formed, the process moves to the cathode application device 616, which applies cathode 208. Thereafter, the formed product (e.g., fuel cell) enters a sacrificial material removal station 618, which may be a heater for melting, an etcher for etching or some other process for removing the sacrificial material. Removal of the sacrificial material 400 exposes the integrate flow paths 216 of fuel cell 200.

In still a further embodiment, while in the foregoing discussion the sacrificial material has been positively applied to the anode substrate (i.e., built up), in alternative embodiments, a mold may be used where the sacrificial material is inserted into openings in the mold, then the layering techniques may be undertaken, and the sacrificial material removed thereafter to also form the non-planar internal or integrated flow channels.

Still further, while the integrated flow channels have been shown constructed on the anode side of the fuel cell, they can also be formed on the cathode side. In such situations, the porous nature of the cathode therefore would not be required or necessary to be employed. Still further, a traditional flow field may be affixed and used on the cathode side.

It is further to be appreciated while roll-to-roll manufacturing has been described in some detail, the present application also describes manufacturing processes which are used in non-roll-to-roll manufacturing such as spin coating. Thus, while the processes described, permit roll-to-roll manufacturing, various ones of the processes are also applicable to other manufacturing methods, including but not limited to the discrete manufacture of the fuel cells.

This fuel cell design is beneficial for a variety of applications including those which are air breathing and require large area membrane electrode assemblies. One application which would require this is the electrochemical capture of atmospheric $CO_2$.

Thus, the foregoing describes fuel cell devices and methods for manufacture in which a structured flow field is built on a flexible but rigid anode upon which a conformal GDE and electrolyte layer is applied topped with a second conformal GDE and cathode. By building the device monolithically the structural integrity can be supplied exclusively by the substrate (anode) while the high performance layers such as the GDE's and electrolyte can be of optimal structure (such as minimal thickness) for high performance. In addition, the use of printing techniques such as inkjet enables fine features in elements such as flow fields and electrolytes to be formed inexpensively.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printed fuel cell, having integrated flow channels comprising:
   an anode layer wherein the anode layer is a solid conductive material without through holes;
   a first gas diffusion electrode layer periodically fixed to the anode layer, wherein the first gas diffusion electrode layer defines integrated flow channels;
   a first catalyst material coated or infused to the first gas diffusion electrode layer;
   an electrolyte membrane covering portions of the anode layer and the first gas diffusion electrode layer with the first catalyst material, the electrolyte membrane configured to not have mechanical integrity when formed as a discrete sheet;
   a second catalyst material coated or infused to the electrolyte membrane;
   a second gas diffusion electrode layer in operative association with the electrolyte membrane and the second catalyst material, on a surface of the electrolyte membrane different from a surface of the electrolyte membrane which is in contact with the first gas diffusion electrode layer; and
   a cathode in contact with the second gas diffusion electrode layer,
   wherein the integrated flow channels are located between the anode and the cathode, and wherein structural support for the fuel cell is provided substantially entirely by the anode and wherein the printed fuel cell is a monolithic device.

2. The printed fuel cell of claim 1, wherein a first surface of the electrolyte membrane is non-planar and an entirety of second surface of the electrolyte membrane is planarized.

3. The printed fuel cell of claim 1, wherein the electrolyte membrane is in contact with the anode through the first gas diffusion electrode layer and the first catalyst material.

4. The printed fuel cell of claim 1, wherein the fuel cell is a hydrogen fuel cell.

5. The printed fuel cell of claim 1, wherein at least one of the first and second gas diffusion electrode layers comprises porous conductive material impregnated with hydrophobic material.

6. The printed fuel cell of claim 1, wherein the electrolyte membrane is a non-crosslinked or heterogeneous ion exchange resin.

7. The printed fuel cell of claim 1, wherein the cathode is a perforated cathode with through holes arrayed throughout the cathode.

8. The printed fuel cell of claim 1, wherein the integrated fuel channels each include a layer of approximately 5-10 μm thick carbon black or polytetrafluorethylene surrounding an inside of each of the channels.

9. The printed fuel cell of claim 1, wherein the monolithic device includes at least one of micro-structures, thin film structures and thick film structures, optimized for high performance.

10. The printed fuel cell of claim 1, wherein the monolithic device includes at least one of printed structures and spray coated structures.

11. The printed fuel cell of claim 1, wherein the integrated fuel channels each include a layer of approximately 5-10 μm thick carbon black or polytetrafluorethylene surrounding an inside of each of the channels.

12. The printed fuel cell of claim 1, wherein the monolithic device includes at least one of micro-structures, thin film structures, and thick film structures optimized for high performance.

13. The printed fuel cell of claim 1, wherein a structure of the first gas diffusion electrode layer defines the integrated flow channels which are located between a surface of the anode and the first gas diffusion electrode layer, and wherein the structure of the first gas diffusion electrode layer corresponds to a provided sacrificial material.

* * * * *